(12) United States Patent
Park

(10) Patent No.: US 12,507,809 B2
(45) Date of Patent: Dec. 30, 2025

(54) HEAD CUSHION MOUNTED ON SIDE WINDOW OF VEHICLE

(71) Applicant: Sung Jin Park, Gyeongsangnam-do (KR)

(72) Inventor: Sung Jin Park, Gyeongsangnam-do (KR)

( * ) Notice: Subject to any disclaimer, the term of this patent is extended or adjusted under 35 U.S.C. 154(b) by 15 days.

(21) Appl. No.: 18/818,763

(22) Filed: Aug. 29, 2024

(65) Prior Publication Data

US 2025/0185814 A1    Jun. 12, 2025

(30) Foreign Application Priority Data

Dec. 8, 2023   (KR) .................. 10-2023-0177317

(51) Int. Cl.
*A47C 20/00* (2006.01)
*A47C 16/00* (2006.01)

(52) U.S. Cl.
CPC .................................. *A47C 16/00* (2013.01)

(58) Field of Classification Search
CPC . A47C 16/00; B60N 2/885; B60N 3/00; B60J 1/2011
See application file for complete search history.

(56) References Cited

U.S. PATENT DOCUMENTS

| 2,642,927 | A | * | 6/1953 | Rising | B60N 2/882 297/410 |
| 4,951,998 | A | * | 8/1990 | McClain | A47C 7/383 297/391 |
| 5,317,772 | A | * | 6/1994 | Perl | A47C 7/383 5/636 |
| 5,800,018 | A | * | 9/1998 | Colombo | B60N 2/882 297/391 |
| 9,185,989 | B1 | * | 11/2015 | Parsons | B60J 3/0247 |
| 2018/0111522 | A1 | * | 4/2018 | Acevedo | B60N 2/882 |

FOREIGN PATENT DOCUMENTS

| KR | 200384591 | 5/2005 |
| KR | 100646422 | 11/2006 |
| KR | 20140083862 | 7/2014 |
| KR | 20170050768 | 5/2017 |

* cited by examiner

*Primary Examiner* — Amy J. Sterling
(74) *Attorney, Agent, or Firm* — IPLA P.A.

(57) ABSTRACT

A head cushion mounted on a side window of a vehicle that is capable of allowing a passenger's lateral head to be supported thereagainst, thereby making him or her lean comfortably thereon and protecting his or her head from impacts. The head cushion, which is mounted on a side window of a vehicle to support a passenger's head thereagainst, includes: a body whose inside is filled with impact absorption materials; and a cushion-mounting part coupled to the body in such a way as to be separably fixed to the side window of the vehicle.

3 Claims, 8 Drawing Sheets

HEAD CUSHION MOUNTED ON SIDE WINDOW OF VEHICLE

CROSS REFERENCE

The present application claims the benefit of Korean Patent Application No. 10-2023-0177317 filed in the Korean Intellectual Property Office on Dec. 8, 2023, the entire contents of which are incorporated herein by reference.

BACKGROUND

The present disclosure relates to a head cushion mounted on a side window of a vehicle, more specifically to a head cushion mounted on a side window of a vehicle that is capable of allowing a passenger's lateral head to be supported thereagainst, thereby making him or her lean comfortably thereon and protecting his or her head from impacts.

One of conventional technologies related to the present disclosure is disclosed in Korean Utility Model Application Laid-open No. 20-2011-0003496 (Dated on Apr. 7, 2011) entitled 'Car cushion having suction lifter'.

The conventional car cushion is configured to have a plurality of suction lifters mounted on one surface of the outer cover thereof in such a way as to be stably attached to a side window of a car, so that if the car cushions are attached to both side windows of the car, they prevent heads or shoulders of passengers, especially children from colliding against both side windows when they are inclined toward one side due to a centrifugal force generated by the car's turning on a tight curve or due to the car's left and right vibrations generated by the car's passing over a bump.

SUMMARY OF THE DISCLOSURE

Accordingly, the present disclosure has been made in view of the above-mentioned problems occurring in the related art, and it is an object of the present disclosure to provide a head cushion mounted on a side window of a vehicle that is capable of allowing a passenger's lateral head to be supported thereagainst, thereby making him or her lean comfortably thereon and protecting his or her head from impacts.

It is another object of the present disclosure to provide a head cushion mounted on a side window of a vehicle that is capable of being provided with a curtain, thereby blocking sunlight and covering the interior of the vehicle.

To accomplish the above-mentioned objects, according to one aspect of the present disclosure, there is provided a head cushion, which is mounted on a side window of a vehicle to support a passenger's head thereagainst, the head cushion including: a body whose inside is filled with impact absorption materials; and a cushion-mounting part coupled to the body in such a way as to be separably fixed to the side window of the vehicle.

According to the present disclosure, desirably, the body may include an upper cushion portion located on an upper portion of the side window of the vehicle and a rear cushion portion located on a rear portion of the side window of the vehicle, the upper cushion and the rear cushion portion being connected to each other in the form of '¬'.

According to the present disclosure, desirably, the rear cushion portion may become high in thickness from top to bottom.

According to the present disclosure, desirably, the cushion-mounting part may include a '∩'-shaped clip coupled to a top of the body in such a way as to be fitted to a top of the side window of the vehicle.

According to the present disclosure, desirably, the head cushion may have a curtain coupled to the body.

According to the present disclosure, desirably, the body may have a curtain-receiving portion concavely formed inward from a side or underside of the body in such a way as to receive the curtain therein.

According to the present disclosure, desirably, the curtain may be made of elastomeric fibers and have a curtain-fixing member mounted on the end portion thereof so that the end portion of the curtain unfolded is fixed to the side window of the vehicle.

To accomplish the above-mentioned objects, according to another aspect of the present disclosure, there is provided a head cushion, which is mounted on a side window of a vehicle to support a passenger's head thereagainst, the head cushion including: a body whose inside is filled with impact absorption materials; and a cushion-mounting part having a support rod extending up and down from the body in such a way as to be located between a top frame and a bottom frame of the side window of the vehicle, pressurizing members located movable up and down on top and underside of the support rod in such a way as to come into close contact with the top frame and the bottom frame, and compression springs disposed between the top and underside of the support rod and the pressurizing members.

According to the present disclosure, desirably, the support rod may have an internal space open on one side thereof so that a curtain is taken out of the internal space of the support rod to block the side window of the vehicle or inserted into the internal space of the support rod.

According to the present disclosure, desirably, the body may include a first body and a second body connected to each other in such a way as to be foldable and unfoldable to each other.

According to the present disclosure, desirably, the first body and the second body may have locking members mounted thereon so that the first body and the second body are fixed to each other in a state of being folded to each other.

According to the present disclosure, desirably, the body may have a lace mounted on the edges thereof to block a gap between the body and a frame of the side window.

To accomplish the above-mentioned objects, according to yet another aspect of the present disclosure, there is provided a head cushion, which is mounted on a side window of a vehicle to support a passenger's head thereagainst, the head cushion including: a body whose inside is filled with impact absorption materials; a support plate for supporting the rear surface of the body; a support plate-mounting part coupled to the support plate in such a way as to be separably fixed to the side window of the vehicle; and a cushion-detaching part located between the body and the support plate in such a way as to allow the body to be separably fixed to the support plate.

According to the present disclosure, desirably, the body may have the shape of 'C' capable of surrounding the passenger's neck, and the support plate may have a support cushion protruding forward therefrom in such a way as to be inserted into a central portion of the body, the support cushion whose inside being filled with the impact absorption materials.

BRIEF DESCRIPTION OF THE DRAWINGS

The above and other objects, features and advantages of the present disclosure will be apparent from the following detailed description of the preferred embodiments of the disclosure in conjunction with the accompanying drawings, in which.

DETAILED DESCRIPTION OF THE PREFERRED EMBODIMENTS

Figure 1:
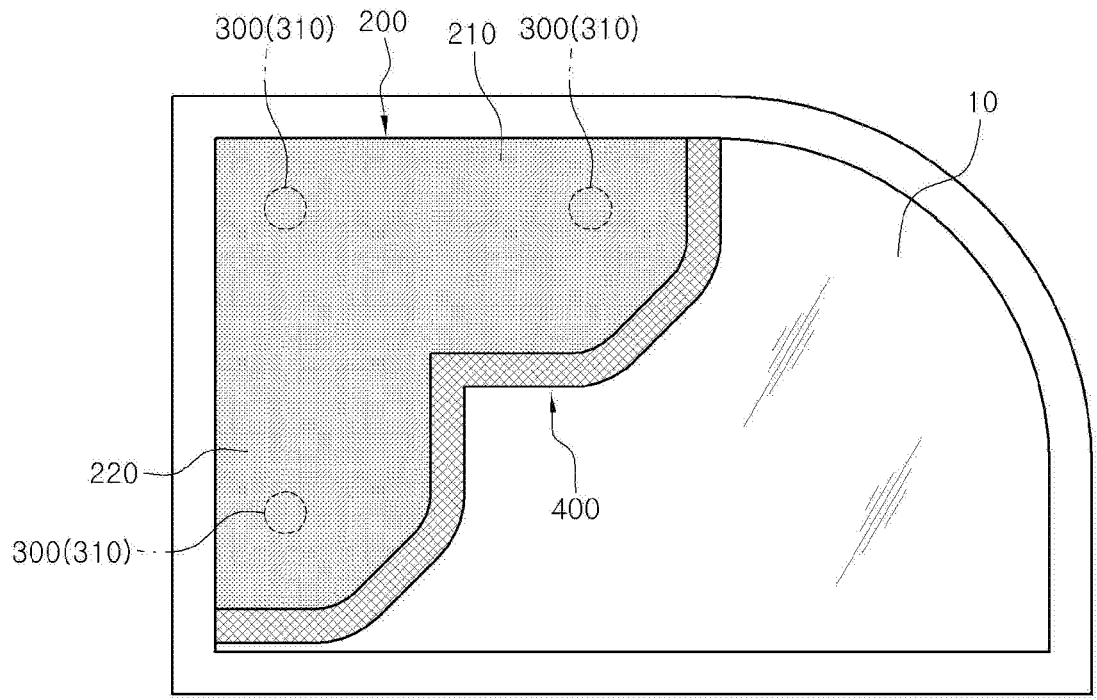
FIG. 1 is a front view showing a use state of a head cushion mounted on a side window of a vehicle according to a first embodiment of the present disclosure.

Hereinafter, embodiments of the present disclosure will be explained in detail with reference to the attached drawings.

In the description, the thicknesses of the lines or the sizes of the components shown in the drawing may be magnified for the clarity and convenience of the description, and the terms as will be discussed later are defined in accordance with the functions of the present invention, but may be varied under the intention or regulation of a user or operator.

Exemplary embodiments of the present invention will be described in detail below with reference to the accompanying drawings. In order to facilitate the general understanding of the present invention in describing the present invention, through the accompanying drawings, the same reference numerals will be used to describe the same components and an overlapped description of the same components will be omitted.

Figure 2:
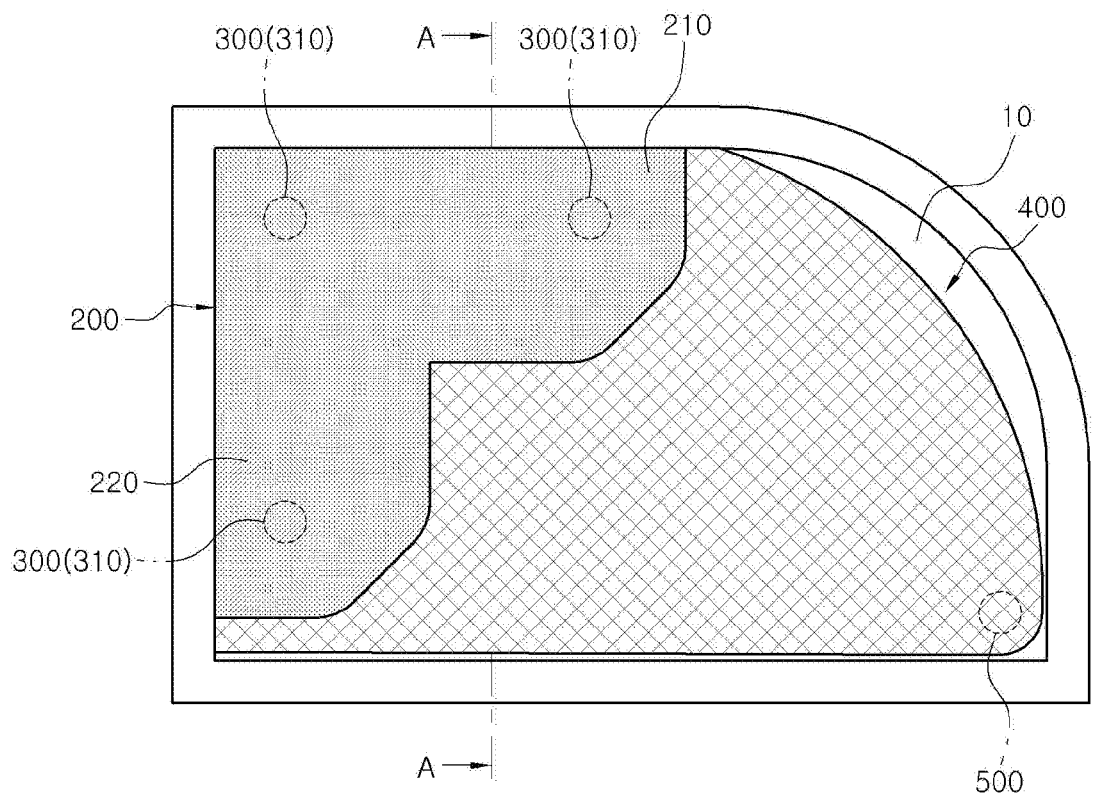
FIG. 2 is a front view showing a state where a curtain of the head cushion of FIG. 1 is unfolded.
Figure 3:
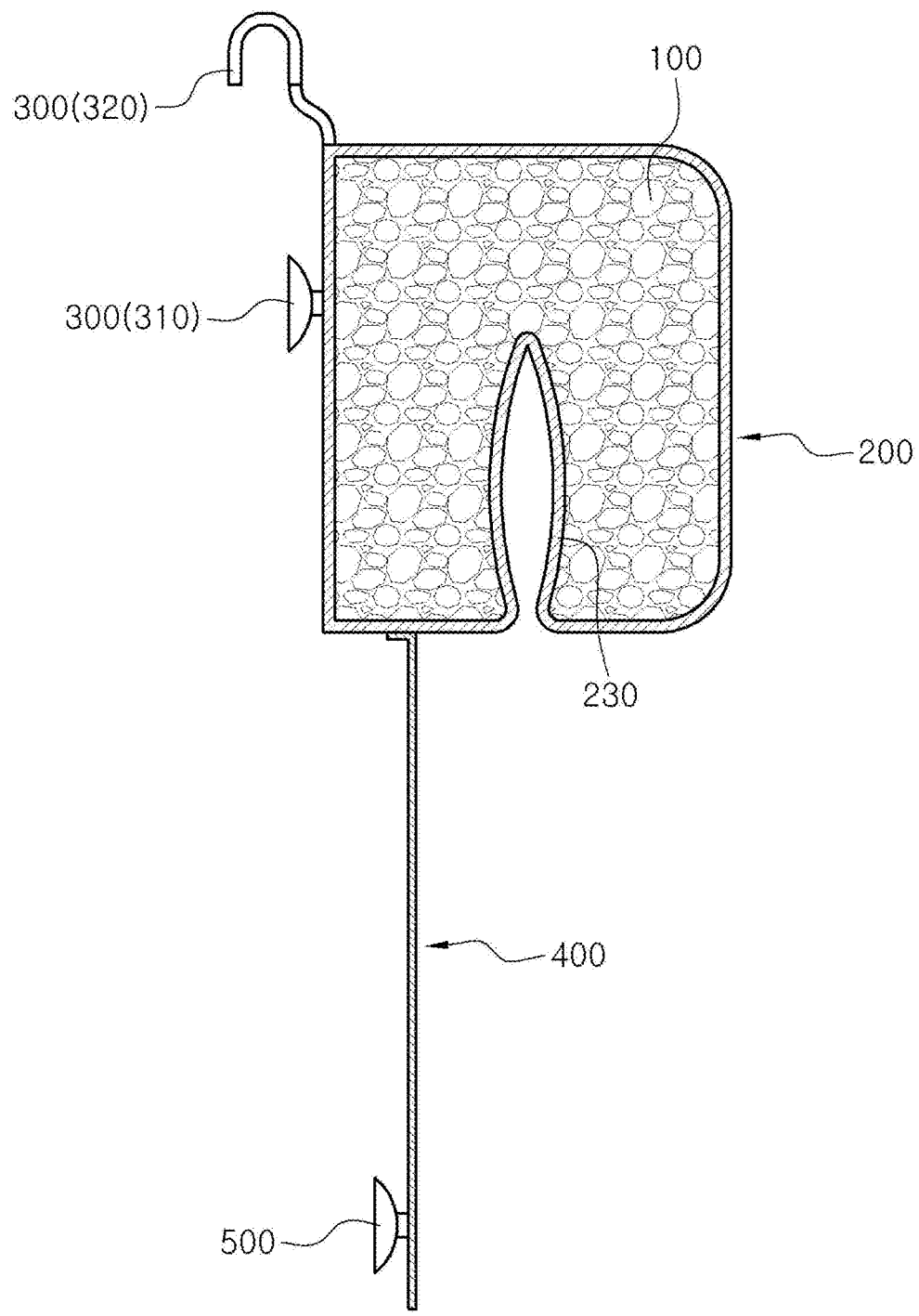
FIG. 3 is a sectional view taken along the line A-A of FIG. 2.

FIG. 1 is a front view showing a use state of a head cushion mounted on a side window of a vehicle according to a first embodiment of the present disclosure, FIG. 2 is a front view showing a state where a curtain of the head cushion of FIG. 1 is unfolded, and FIG. 3 is a sectional view taken along the line A-A of FIG. 2.

As shown in FIGS. 1 to 3, a head cushion according to a first embodiment of the present disclosure, which is mounted on a side window 10 of a vehicle to support a passenger's head thereagainst, includes: a body 200 whose inside is filled with impact absorption materials 100; and a cushion-mounting part 300 coupled to the body 200 in such a way as to be separably fixed to the side window 10 of the vehicle.

The impact absorption materials 100 are made of memory foams, PE foams, polyester, cotton, etc. If necessary, the impact absorption materials 100 may be made of materials floating on water, so that the head cushion of the present disclosure can be used as a safety tool if a drowning accident occurs.

The body 200 is made of a waterproofing fabric or napped fabric.

The body 200 includes an upper cushion portion 210 located on an upper portion of the side window 10 of the vehicle and a rear cushion portion 220 located on a rear portion of the side window 10 of the vehicle, and in this case, the upper cushion 210 and the rear cushion portion 220 are connected to each other in the form of '¬'.

Under the above-mentioned configuration, the body 200 serves to support a passenger's head thereagainst and allows the upper cushion portion 210 to have a function of a sun visor. If the head cushion is mounted on the side window 10 close to a front seat of the vehicle, a driver's visual field for a side mirror is not hidden by the head cushion of the present disclosure.

The body 200, especially the rear cushion portion 220 becomes high in thickness from top to bottom. This solves a problem that the passenger cannot lean on the body 200 comfortably since the body 200 becomes distant from the passenger's head as it goes toward the bottom thereof due to the curved surface of the side window 10 of the vehicle.

The cushion-mounting part 300 includes: suction plates 310 coupled to the rear surface of the body 200; and a '∩'-shaped clip 320 coupled to a top of the body 200 in such a way as to be fitted to a top of the side window 10 of the vehicle.

The cushion-mounting part 300 selectively includes the suction plates 310 or the clip 320 if necessary. Further, the cushion-mounting part 300 includes Velcro tapes alone, and otherwise, it may include the suction plates 310 and/or the clip 320.

Further, the head cushion according to the first embodiment of the present disclosure has a curtain 400 mounted onto the body 200. The curtain 400 serves to cover an area not occupied by the body 200 on the side window 10 of the vehicle, thereby blocking sunlight and covering the interior of the vehicle.

The curtain 400 is desirably made of elastomeric fibers having excellent elasticity.

The curtain 400 has a curtain-fixing member 500 mounted on the end portion thereof so that the end portion of the curtain 400 unfolded is fixed to the side window 10 of the vehicle. The curtain-fixing member 500 is formed of a suction plate.

The body 200 has a curtain-receiving portion 230 adapted to receive the curtain 400 therein. In this case, the curtain-receiving portion 230 is concavely formed inward from the side or underside of the body 200, thereby being prevented from being exposed to the outside in a state of receiving the curtain 400 therein.

Figure 4:
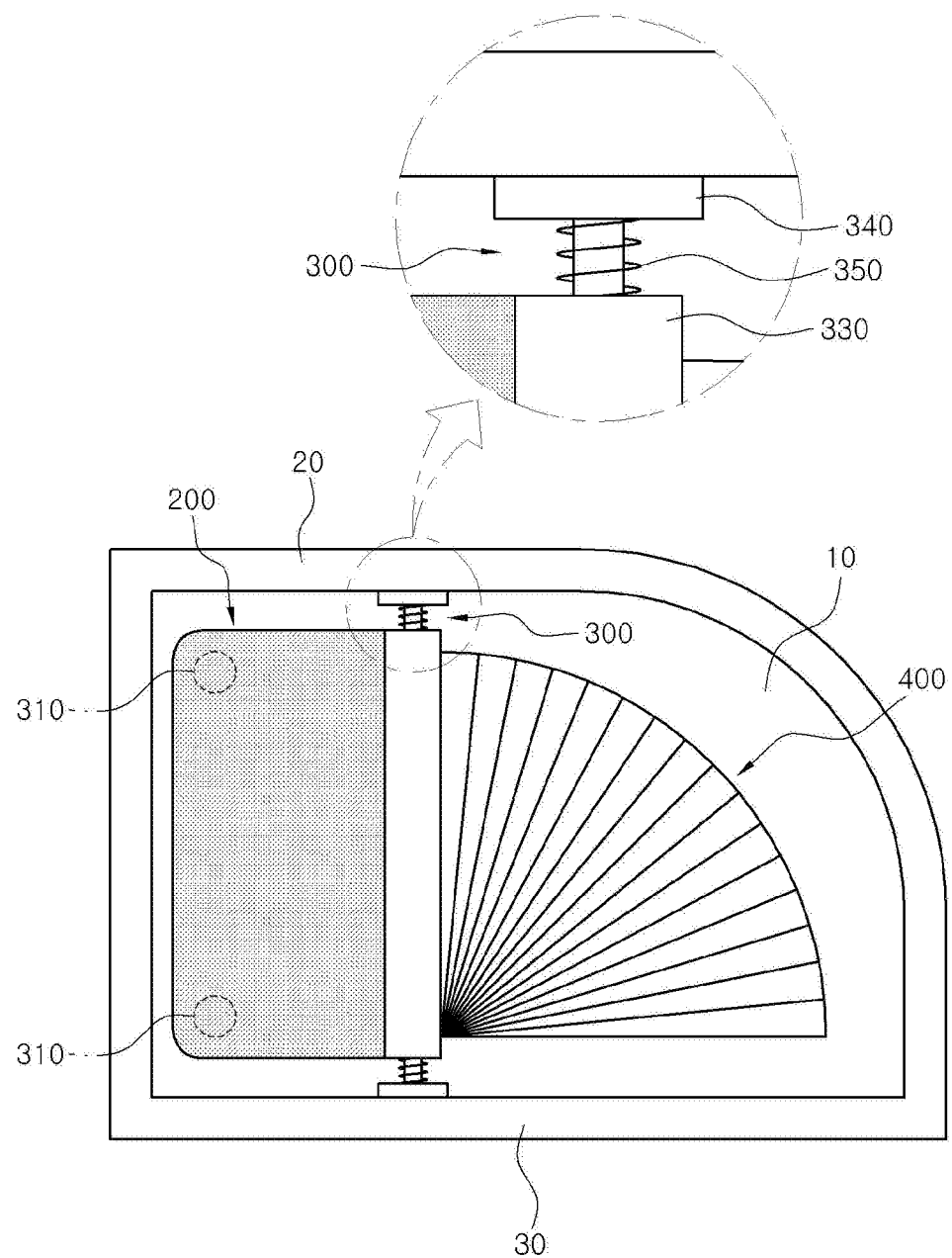
FIG. 4 is a front view showing a use state of a head cushion mounted on a side window of a vehicle according to a second embodiment of the present disclosure.

FIG. 4 is a front view showing a use state of a head cushion mounted on a side window of a vehicle according to a second embodiment of the present disclosure.

As shown in FIG. 4, a head cushion according to a second embodiment of the present disclosure includes: a body 200; and a cushion-mounting part 300 including: a support rod 330 extending up and down from the body 200 in such a way as to be located between a top frame 20 and a bottom frame 30 of the side window 10 of the vehicle; pressurizing members 340 located movable up and down on top and underside of the support rod 330 in such a way as to come into close contact with the top frame 20 and the bottom frame 30; and compression springs 350 disposed between the top and underside of the support rod 330 and the pressurizing members 340.

Under the above-mentioned configuration of the cushion-mounting part 300, the support rod 330 and the pressurizing members 340 are kept fitted to a space between the top frame 20 and the bottom frame 30 by means of the elastic forces of the compression springs 350, thereby allowing the body 200 to be mounted on the side window 10 of the vehicle.

Further, the support rod 330 has an internal space open on one side thereof so that a curtain 400 is taken out of the internal space of the support rod 330 to block the side window 10 of the vehicle or inserted into the internal space of the support rod 330.

In this case, as shown, the curtain 400 has the shape of a folding fan, and if necessary, the curtain 400 has the shape of a roll screen.

Figure 5A:
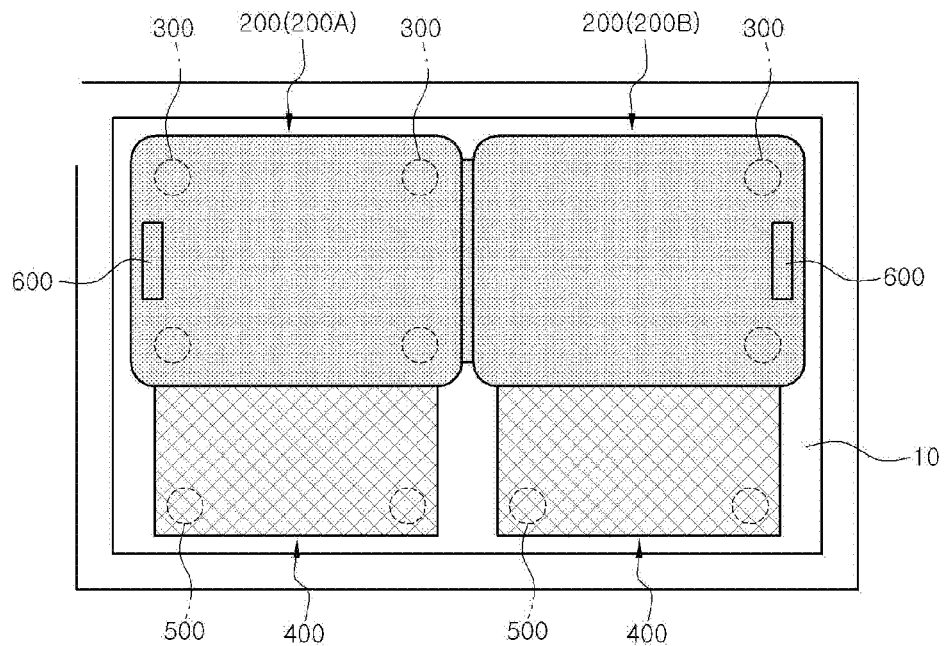
FIGS. 5A and 5B are front views showing use states of a head cushion mounted on a side window of a vehicle according to a third embodiment of the present disclosure.
Figure 5B:
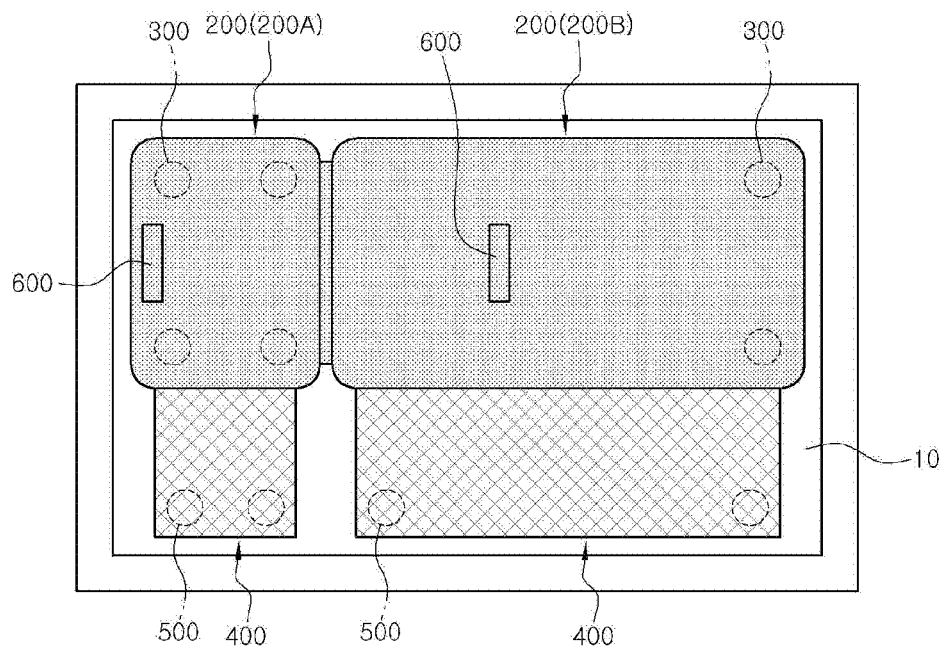
Figure 6:
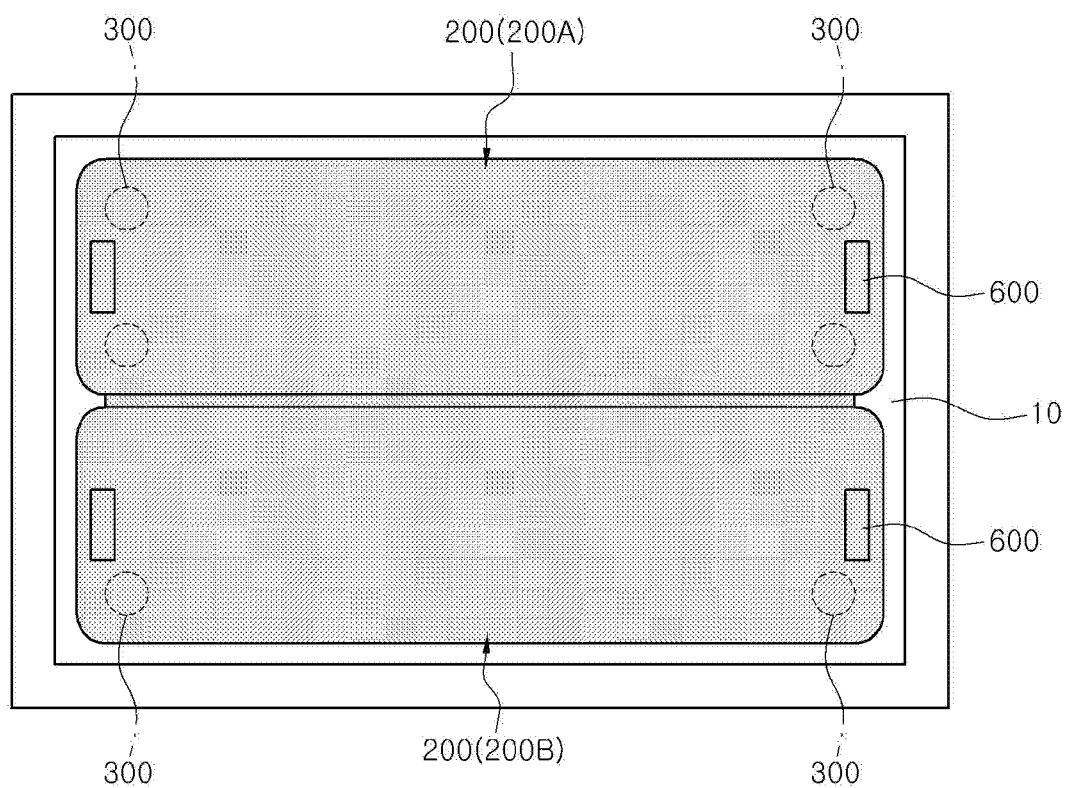
FIG. 6 is a front view showing a use state of a head cushion mounted on a side window of a vehicle according to a fifth embodiment of the present disclosure.

FIGS. 5A and 5B are front views showing use states of a head cushion mounted on a side window of a vehicle according to a third embodiment of the present disclosure, and FIG. 6 is a front view showing a use state of a head cushion mounted on a side window of a vehicle according to a fifth embodiment of the present disclosure.

As shown in FIGS. 5A to 6, a body 200 consists of a first body 200A and a second body 200B connected to each other in such a way as to be foldable and unfoldable to each other.

In this case, as shown in FIGS. 5A and 5B, the first body 200A and the second body 200B are foldable and unfoldable to each other in left and right directions, and further, as shown in FIG. 6, the first body 200A and the second body 200B are foldable and unfoldable to each other in upward and downward directions.

If the first body 200A and the second body 200B are connected to each other in left and right directions, curtains 400, curtain-fixing members 500, and curtain-receiving portions 230 are provided for the respective first and second cushion bodies 200A and 200B.

If the first body 200A and the second body 200B are connected to each other in left and right directions, curtains 400, the first body 200A and the second body 200B have the same length as each other, as shown in FIG. 5A, and otherwise, the first body 200A and the second body 200B have different lengths from each other, as shown in FIG. 5B.

If the first body 200A and the second body 200B have different lengths from each other, the first body 200A having a shorter length than the second body 200B is located on a rear side of the side window 10 of the vehicle, and the second body 200B having a longer length than the first body 200A is located on a front side of the side window 10 of the vehicle. Under the above-mentioned configuration, if the second body 200B is folded to the first body 200A, a portion of the second body 200B extends backward from the side window 10 of the vehicle, thereby allowing the passenger to lean comfortably on the second body 200B even in a state where his or her seat tilts backward.

If the first body 200A and the second body 200B are connected to each other in upward and downward directions, they are folded to each other and thus located on an upper portion of the side window 10 of the vehicle, thereby being utilized as a sun visor.

Further, as shown in FIGS. 5A to 6, the first body 200A and the second body 200B have locking members 600 mounted thereon so that they are fixed to each other in a state of being folded to each other.

The locking members 600 are formed of Velcro tapes, magnets, snap buttons, or the like, which are located on the folded surfaces of the first body 200A and the second body 200B.

Figure 7:
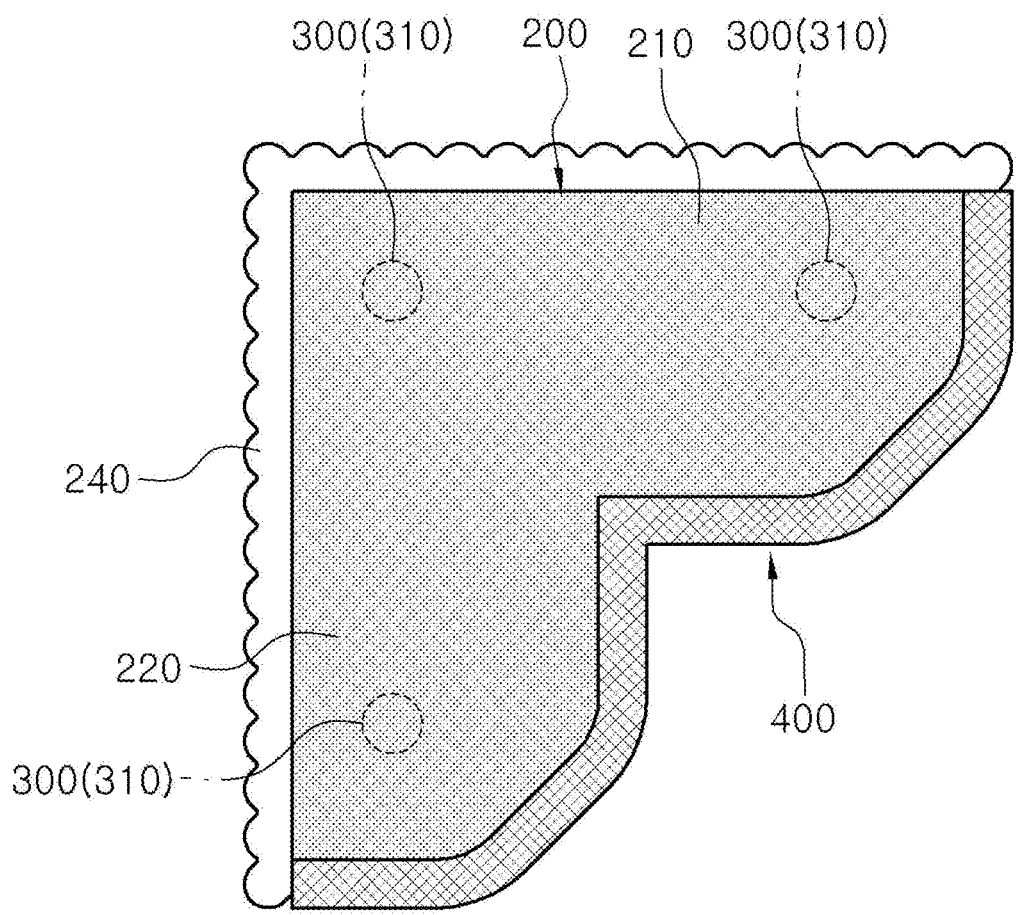
FIG. 7 is a front view showing a head cushion mounted on a side window of a vehicle according to a fifth embodiment of the present disclosure.

FIG. 7 is a front view showing a head cushion mounted on a side window of a vehicle according to a fifth embodiment of the present disclosure.

As shown in FIG. 7, a head cushion according to a fifth embodiment of the present disclosure has a body 200 with a lace 240 mounted on the edges thereof.

The lace 240 serves to block a gap between the body 200 and a frame of a side window 10 in a state where the head cushion of the present disclosure is mounted on the side window 10 of the vehicle.

Figure 8:
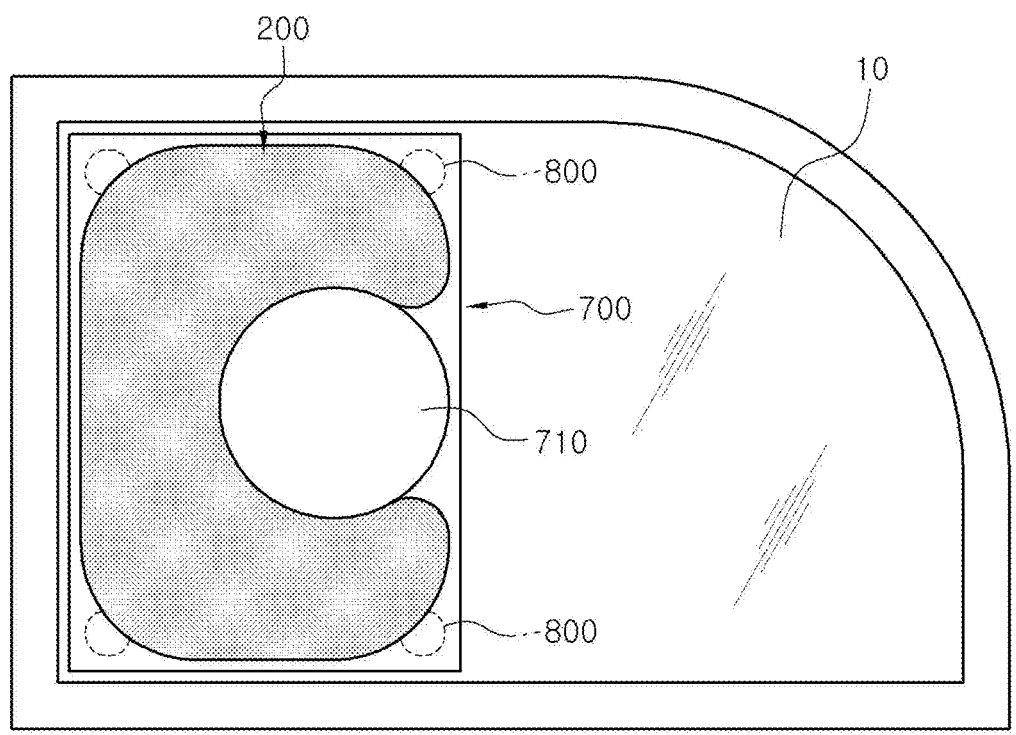
FIG. 8 is a front view showing a use state of a head cushion mounted on a side window of a vehicle according to a sixth embodiment of the present disclosure.
Figure 9:
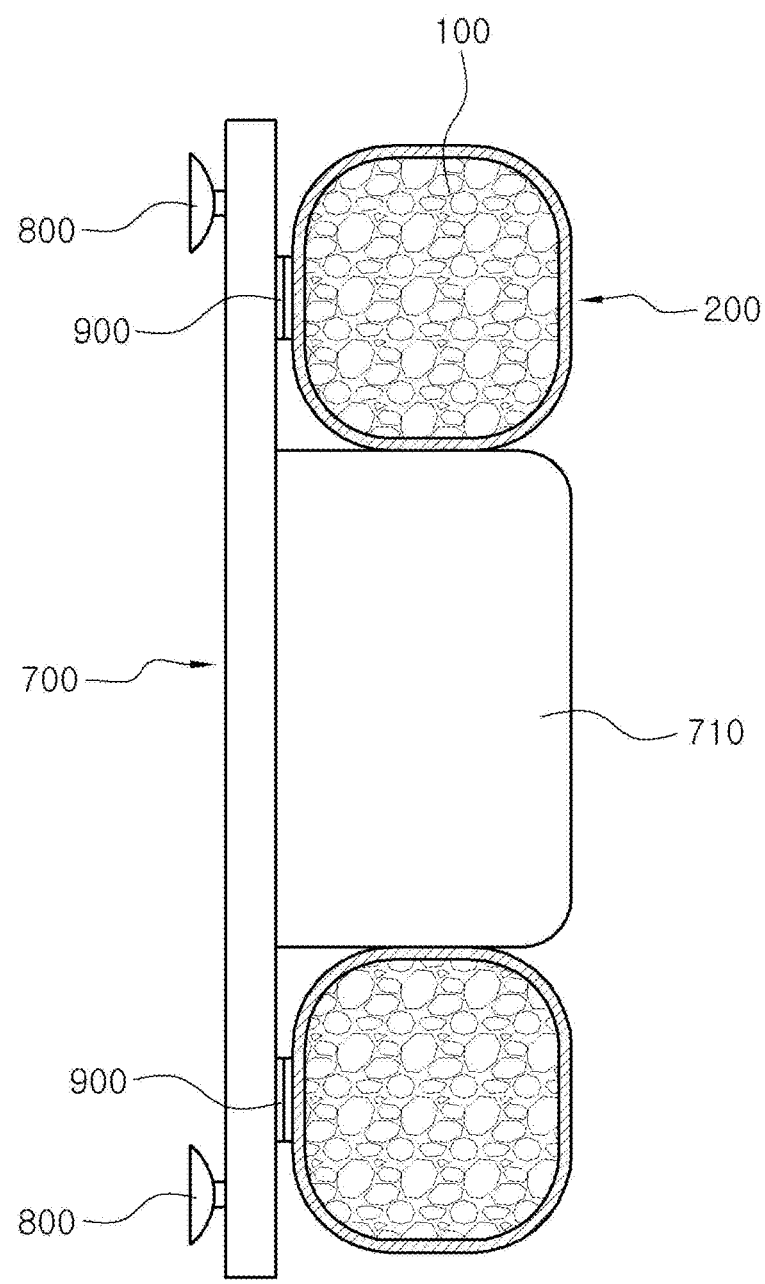
FIG. 9 is a side sectional view showing the head cushion mounted on a side window of a vehicle according to the sixth embodiment of the present disclosure.

FIG. 8 is a front view showing a use state of a head cushion mounted on a side window of a vehicle according to a sixth embodiment of the present disclosure, and FIG. 9 is a side sectional view showing the head cushion mounted on a side window of a vehicle according to the sixth embodiment of the present disclosure.

As shown in FIGS. 8 and 9, a head cushion according to a sixth embodiment of the present disclosure, which is mounted on a side window 10 of a vehicle to support a passenger's head thereagainst, includes: a body 200 whose inside is filled with impact absorption materials 100; a support plate 700 for supporting the rear surface of the body 200; a support plate-mounting part 800 coupled to the support plate 700 in such a way as to be separably fixed to the side window 10 of the vehicle; and a cushion-detaching part 900 located between the body 200 and the support plate 700 in such a way as to allow the body 200 to be separably fixed to the support plate 700.

That is, the head cushion according to the sixth embodiment of the present disclosure is configured to allow the body 200 to be attached to the support plate 700 or separated from the support plate 700 in a state where the support plate 700 is fixed to the side window 10 of the vehicle by means of the support plate-mounting part 800.

The support plate-mounting part 800 consists of the suction plates 310 and/or the clip 320, and if necessary, it may consist of the support rod 330, the pressurizing members 340, and the compression springs 350.

The cushion-detaching part 900 consists of Velcro tapes, magnets, snap buttons, or the like, which are located between the body 200 and the support plate 700.

Further, the head cushion according to the sixth embodiment of the present disclosure is configured to have the body 200 having the shape of 'C' capable of surrounding the passenger's neck, thereby being utilized as a neck pillow.

In this case, the support plate 700 has a support cushion 710 protruding forward therefrom in such a way as to be inserted into a central portion of the body 200. As the inside of the support cushion 710 is filled with impact absorption materials, the support cushion 710 absorbs impacts, like the body 200. As a result, if the body 200 is attached to the support plate 700, the central portion of the body 200 is filled with the support cushion 710, so that the support cushion 710 supports the passenger's head, together with the body 200.

As described above, the head cushion mounted on the side window of the vehicle according to the present disclosure allows a passenger's lateral head to be supported thereagainst, thereby making him or her lean comfortably thereon and protecting his or her head from impacts.

Further, the head cushion mounted on the side window of the vehicle according to the present disclosure is provided with the curtain, thereby blocking sunlight and covering the interior of the vehicle.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A head cushion, which is mounted on a side window (10) of a vehicle to support a passenger's head thereagainst, the head cushion comprising:
   a body (200) whose inside is filled with impact absorption materials (100); and
   a cushion-mounting part (300) coupled to the body (200) in such a way as to be separably fixed to the side window (10) of the vehicle,
   wherein the body (200) is configured to have an upper cushion portion (210) located on an upper portion of the side window (10) of the vehicle and a rear cushion portion (220) located on a rear portion of the side window (10) of the vehicle, the upper cushion (210) and the rear cushion portion (220) being connected to each other in the form of '¬' and the rear cushion portion (220) becoming high in thickness from top to bottom,
   the cushion-mounting part (300) comprises a '∩'-shaped clip (320) coupled to a top of the body (200) in such a way as to be fitted to a top of the side window (10) of the vehicle, and
   the body (200) comprises: a curtain (400) coupled thereto to cover an area not occupied thereby on the side window (10) of the vehicle so that through the curtain (400), sunlight is blocked and an interior of the vehicle is covered, the curtain (400) being made of elastomeric fibers; a curtain-receiving portion (230) concavely formed inward from a side or underside of the body (200) in such a way as to receive the curtain (400) therein, the curtain (400) having a curtain-fixing member 500 mounted on the end portion thereof so that the end portion of the curtain (400) unfolded is fixed to the side window (10) of the vehicle; and a lace (240) mounted on the edges thereof to block a gap between the body (200) and a frame of the side window (10).

2. The head cushion according to claim 1, wherein the body (200) comprises a first body (200A) and a second body (200B) connected to each other in such a way as to be foldable and unfoldable to each other.

3. The head cushion according to claim 2, wherein the first body (200A) and the second body (200B) have locking members (600) mounted thereon so that the first body (200A) and the second body (200B) are fixed to each other in a state of being folded to each other.

* * * * *